Oct. 10, 1961 W. OTT 3,003,601
WELD CONNECTION
Filed March 28, 1958

INVENTOR.
WALTER OTT
BY
ATTORNEY.

United States Patent Office 3,003,601
Patented Oct. 10, 1961

3,003,601
WELD CONNECTION
Walter Ott, Elgg/ZH, Switzerland, assignor to Sulzer Frères, S.A., Winterthur, Switzerland, a corporation of Switzerland
Filed Mar. 28, 1958, Ser. No. 724,730
Claims priority, application Switzerland Apr. 4, 1957
3 Claims. (Cl. 189—36)

The present invention relates to a welded connection of parts which are provided with portions extending one into the other for correct relative placement of the parts.

The ends of pipes which must be connected with boiler drums or tube sheets of heat exchangers and the like are frequently provided with a centering or guide rim which extends into a short cylindrical recess in the bore of the boiler plate or tube sheet. Such rims must be relatively thick to prevent melting during the welding operation. If the rim sits on the bottom of the recess, the interior wall of the connection is smooth, the tube is accurately centered, and its longitudinal axis is in the desired position. However, a structure of this type is considerably stressed when the weld is made and produces tensions in the weld seam which may cause cracking of the seam. For this reason abutment of the centering rim against the bottom of the recess is usually avoided, resulting in an annular recess and inaccurate position of the tube.

It is an object of the present invention to provide a weld connection which avoids the aforedescribed disadvantages of conventional structures. The connection, according to the invention, of two parts which must be welded, one to the other, includes a rim on one of the parts which rim extends into a suitable recess in the other part, the end face of the rim abutting against the bottom of the recess; the portion of the rim which is adjacent to the weld has a considerable thickness whereas the portion of the rim which is adjacent to the bottom of the recess is relatively thin so that the last mentioned portion can be deformed upon shrinking of the structure, after the weld has been made, without causing excessive pretensioning of the weld connection.

The novel features which are considered characteristic of the invention are set forth with particularly in the appended claims. The invention itself, however, and additional objects and advantages thereof will best be understood from the following description of embodiments thereof when read in connection with the accompanying drawing in which:

Figure 1:
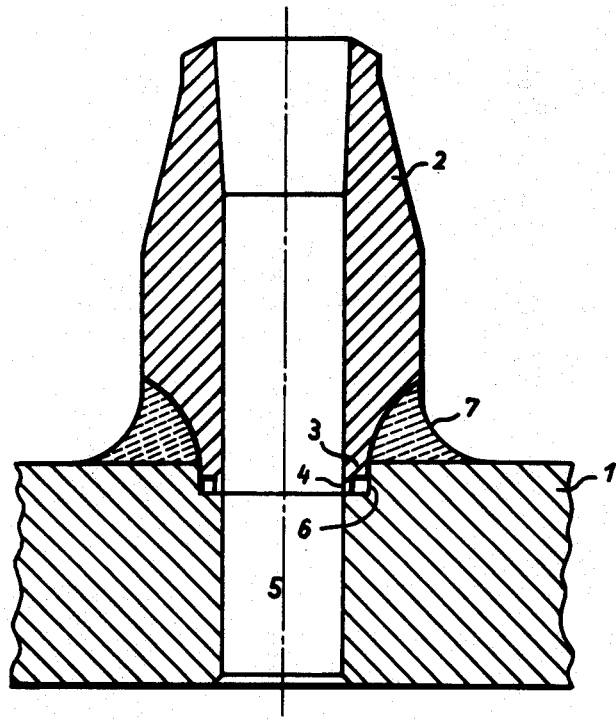
FIG. 1 is a sectional view of a connection of a tube end with a sheetlike material.

Referring more particularly to FIG. 1 of the drawing numeral 1 designates a wall, for example, of a vessel to which a tube 2 is welded. The end of the tube is tapered and has a surface facing the wall 1, a weld seam 7 being made between the surface of the tapered end of the tube 2 and the surface portion of the wall 1 faced by said surface of the tapered tube end. The thin end of the tapered end of the tube 2 is provided with an annular tonguelike extension or rim 3 which has a recess or step to form a marginal portion 4 of smaller thickness than that of the relatively thick portion which is adjacent to the weld. Numeral 6 designates an annular recess at the end of the bore 5 which is to be connected with the tube 2, the rim 3, 4 of the tube extending into the annular recess. The depth of the recess 6 corresponds to the relatively thick portion of the tonguelike extension. The end of the rim portion 4 abuts against the bottom of the recess 6 so that the end of the tube 2 is in the correct position with respect to the sheet 1.

Figure 2:
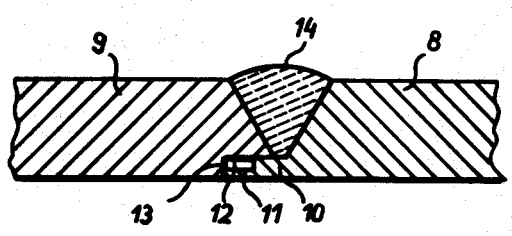
FIG. 2 is a sectional view of a welded connection of two sheets.

FIG. 2 illustrates a weld connection for two steel sheets 8 and 9. The sheets have slanted edges which are interconnected by a weld 14. A portion 10 of the sheet 8 projects beyond the slanted edge of the sheet into a suitable recess 12 in the edge portion of the sheet 9. The marginal part 11 of the portion 10 forms a step and is thinner than the part of the portion 10 which part is adjacent to the slanted edge of the sheet 8. The end face of the marginal part 11 abuts against the end wall 13 of the recess 12. The weld connection shown in FIG. 2 is of particular advantage in cases where the seam must be accessible from both sides and where the weld seam should not be visible on one side which side should be smooth without special finishing.

In the embodiments of the invention shown in FIGS. 1 and 2 the tonguelike extension of one piece which extension is inserted into a corresponding recess of the other piece, has a substantially rectangular cross section. The surface of the extension which is distal with respect to the weld seam is flush with a surface of the connected part. The tonguelike extensions may have different configurations without departing from the scope of the invention, provided that the cross section or thickness of the extreme end portion of the extension is smaller than the thickness or cross section of the portion of the extension which is adjacent to the weld seam. Due to the difference between the depth of the recess 10 and the thickness of the relatively thin portion of the tonguelike extension, an empty space is formed between the relatively thin portion and the bottom of the recess so that the relatively thin portion is free to be deformed for absorbing stresses caused by the shrinking of the weld. Provision of the relatively thin end portion is essential for providing the desired yieldableness on which the present invention is based.

Figure 3:
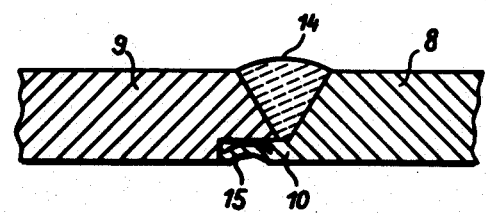
FIG. 3 is a sectional view of a modified welded connection of two sheets.

FIG. 3 illustrates a connection which is similar to that shown in FIG. 2. However, the relatively thin portion 15 of the extension 10 has a curved cross sectional configuration for increasing yieldability.

As is obvious from the illustrated examples, the guide rim projecting from one of two pieces, which must be connected by welding, into a corresponding recess in the other piece serves as a spacer for holding the pieces which must be connected by welding in the correct relative positions.

The part of the projecting rim which part is adjacent to the weld seam is so thick that it resists deformation during the welding operation. The part of the projecting rim which is farther away from the welding zone is considerably thinner so that it can be elastically and/or plastically deformed without unduly stressing the weld seam. The part of the rim which is away from the welding zone may have configurations which are different from those illustrated. For example, the rim may be tapered instead of stepped and the relatively thin part of the rim may be curved or otherwise profiled as generally indicated in FIG. 3.

The weld connection according to the invention can be used for many different purposes and is equally well suited for straight and curved weld seams. The weld connection according to the invention is particularly useful for welding blades or buckets of turbomachines to the respective carriers or for interconnecting turbine rotor discs or other bodies of rotation.

I claim:

1. A weld connection for connecting two elements, wherein at least one of said elements has a tapered portion having a surface, the second element having a surface portion facing said surface of said tapered portion, and a weld placed between said surface of said tapered portion and said surface portion of the second element, the thin end of said tapered portion having a tonguelike extension including a relatively thick portion adjacent to said tapered portion and a relatively thin end portion extending from said relatively thick portion and forming a step therewith, said second element having a recess shaped to receive said tonguelike extension, the depth of said recess corresponding to the thickness of said relatively thick portion, an empty space being formed between said relatively thin end portion and the bottom of said recess whereby said relatively thin portion is free to be deformed for absorbing stresses caused by the shrinking of the weld.

2. A weld connection as defined in claim 1 wherein said recess has an end wall abutted by the end of the relatively thin portion of said tonguelike extension whereby said elements are endwisely accurately positioned.

3. A weld connection according to claim 2 wherein said relatively thin portion of said tonguelike extension has a curved cross sectional configuration to facilitate deformation of said relatively thin portion upon shrinking of the weld.

References Cited in the file of this patent

UNITED STATES PATENTS

| | | |
|---|---|---|
| 1,903,315 | Priebe | Apr. 4, 1933 |
| 2,015,246 | Taylor | Sept. 24, 1935 |
| 2,037,962 | Brown | Apr. 21, 1936 |
| 2,206,166 | Dunn | July 2, 1940 |
| 2,396,320 | Gaudenzo | Mar. 12, 1946 |
| 2,584,653 | Alpert | Feb. 5, 1952 |
| 2,710,443 | Webb | June 14, 1955 |
| 2,732,229 | Guam | Jan. 24, 1956 |

FOREIGN PATENTS

| | | |
|---|---|---|
| 615,055 | Germany | of 1932 |
| 776,947 | France | of 1934 |